(12) United States Patent
Banks (10) Patent No.: US 8,438,352 B2
(45) Date of Patent: May 7, 2013

(54) DATA REPLICATION FROM ONE-TO-ONE OR ONE-TO-MANY HETEROGENEOUS DEVICES

(75) Inventor: Justin G. Banks, Salt Lake City, UT (US)

(73) Assignee: Quest Software, Inc., Aliso Viejo, CA (US)

( * ) Notice: Subject to any disclaimer, the term of this patent is extended or adjusted under 35 U.S.C. 154(b) by 0 days.

(21) Appl. No.: 12/959,913

(22) Filed: Dec. 3, 2010

(65) Prior Publication Data

US 2011/0302381 A1    Dec. 8, 2011

Related U.S. Application Data

(63) Continuation of application No. 11/419,958, filed on May 23, 2006, now Pat. No. 7,870,354, which is a continuation-in-part of application No. 10/980,875, filed on Nov. 3, 2004, now Pat. No. 7,836,014.

(60) Provisional application No. 60/683,765, filed on May 24, 2005, provisional application No. 60/517,253, filed on Nov. 4, 2003.

(51) Int. Cl.
*G06F 12/00* (2006.01)

(52) U.S. Cl.
USPC .................................. 711/162; 711/E12.103

(58) Field of Classification Search .......................... None
See application file for complete search history.

(56) References Cited

U.S. PATENT DOCUMENTS

| | | |
|---|---|---|
| 4,881,166 A | 11/1989 | Thompson et al. |
| 5,295,075 A | 3/1994 | Korner et al. |

(Continued)

FOREIGN PATENT DOCUMENTS

WO    WO-01/35244 A1    5/2001

OTHER PUBLICATIONS

A.A. El Haddi et al., "Using File replication for business continuance and content distribution.", www.constantdata.com, May 2003, (8 pages).

(Continued)

*Primary Examiner* — Edward Dudek, Jr.
*Assistant Examiner* — John P Fishburn
(74) *Attorney, Agent, or Firm* — Knobbe Martens Olson & Bear LLP (57) ABSTRACT

Embodiments of the system described herein can be implemented in a software application that runs on a host device or is embedded in a logic or memory device such as a gate array, EEPROM, a control, or dynamical system. The system embodiment allows a set of similar or dissimilar intelligent devices or sensors, which may be interconnected with any type of network or bus, to replicate data between themselves for the purpose of remote backup, redundancy, content distribution, or measurements. The attributes of the data, which may be changed or created on one device or passed through the device, are tracked and journaled in volatile or non-volatile storage in a first phase. This occurs in real-time as the data changes or passes through the device. In a second phase, the attributes that match patterns pre-specified in a configuration are used to decide what changes or the content to replicate to one or more devices. In a third phase, the data is replicated. In practice, the techniques described herein are independent of hardware, operating systems, and applications. The example embodiment is designed to be transparent for system redundancy and error recovery processes such as error correction, retransmission on links, and raid reconfiguration.

10 Claims, 12 Drawing Sheets

U.S. PATENT DOCUMENTS

| | | | |
|---|---|---|---|
| 5,353,232 | A | 10/1994 | Vollmayr |
| 5,434,793 | A | 7/1995 | Korner |
| 5,710,922 | A | 1/1998 | Alley et al. |
| 5,721,915 | A | 2/1998 | Sockut et al. |
| 5,778,388 | A | 7/1998 | Kawamura et al. |
| 5,794,252 | A | 8/1998 | Bailey et al. |
| 5,819,020 | A * | 10/1998 | Beeler, Jr. .................... 714/5.11 |
| 5,920,725 | A | 7/1999 | Ma et al. |
| 5,974,563 | A | 10/1999 | Beeler, Jr. |
| 6,442,748 | B1 | 8/2002 | Bowman-Amuah |
| 6,496,908 | B1 | 12/2002 | Kamvysselis et al. |
| 6,539,396 | B1 | 3/2003 | Bowman-Amuah |
| 6,597,983 | B2 | 7/2003 | Hancock |
| 6,662,196 | B2 | 12/2003 | Holenstein et al. |
| 6,898,609 | B2 | 5/2005 | Kerwin |
| 6,937,730 | B1 * | 8/2005 | Buxton ......................... 380/241 |
| 7,069,267 | B2 | 6/2006 | Spencer, Jr. |
| 7,130,870 | B1 | 10/2006 | Pecina et al. |
| 7,233,975 | B1 | 6/2007 | Gerraty et al. |
| 7,836,014 | B2 | 11/2010 | Banks et al. |
| 7,870,354 | B2 | 1/2011 | Banks |
| 2003/0014433 | A1 | 1/2003 | Teloh et al. |
| 2004/0133591 | A1 | 7/2004 | Holenstein et al. |
| 2005/0149578 | A1 | 7/2005 | Sustman et al. |
| 2006/0059511 | A1 | 3/2006 | Nocifera et al. |
| 2007/0038823 | A1 | 2/2007 | Banks |
| 2011/0251996 | A1 | 10/2011 | Sustman et al. |

OTHER PUBLICATIONS

Lanches, P., International Search Report for PCT/US2004/036474 as mailed Dec. 9, 2005 (7 pages).

Gladney, H.M., "Data Replicas in Distributed Information Services", ACM Transactions on Database Systems, vol. 14, No. 1, Mar. 1989, pp. 75-97.

Nordin, Brent, et al., "Remote Operations Across a Network of Small Computers", ACM, 1986, pp. 110-114.

Adusumilli, Panduranga Rao, "An Integrated Solution for Managing Replicated Data in Distributed Systems", ACM, 1993, pp. 351-357.

Kahane, Yehuda, et al., "Computer Backup Pools, Disaster Recovery, and Default Risk", Communications of the ACM, Jan. 1988, vol. 31, No. 1, pp. 78-83.

Ma, Chaoying, "On Building Very Large Naming Systems", Cambridge University Computer Lab, 1992, pp. 1-5.

Herlihy, Maurice, "Taking Concurrency Seriously", 1989, 2 pages.

Birman, Kenneth P., "Replication and Fault-Tolerance in the ISIS System", ACM, 1985, p. 79-86.

Liskov, Barbara, et al., "A Replicated Unix File System", Jul. 31, 1990, (9 pages).

Mullender, Sape J., et al., "Simulating Wide-area Replication", 1994, (8 pages).

McDermott, John, P. et al., "A Single-Level Scheduler for the Replicated Architecture for Multilevel-Secure Databases", 1991, (10 pages).

Liskov, Barbara, et al., "Replication in the Harp File System", ACM, 1991, pp. 226-238.

Ladin, Rivka, et al., "Lazy Replication: Exploiting the Semantics of the Distributed Services", ACM, 1990, pp. 43-57.

Joseph, Thomas A., et al., "Low Cost Management of Replicated Data in Fault-Tolerant Distributed Systems", ACM Transactions on Computer Systems, vol. 4, No. 1, Feb. 1986, pp. 54-70.

Birrell, Andrew D., et al., Grapevine: An Exercise in Distributed Computing, Communications of the ACM, Apr. 1982, vol. 25, No. 4, pp. 260-274.

Ruan, Zuwang, et al., "Performance Analysis of File Replication Schemes in Distributed Systems", ACM, 1987, pp. 205-215.

Kim, Won, "Highly Available Systems for Database Applications", Computing Surveys vol. 16, No. 1, Mar. 1984, (28 pages).

Garcia-Molina, Hector, et al., "The Cost of Data Replication", 1981, pp. 193-198.

Ladin, Rivka, et al., "Providing High Availability Using Lazy Replication", ACM Transactions on Computer Systems, vol. 10, No. 4, Nov. 1992, pp. 360-391.

Bhide, Anupam, et al., "An Efficient Scheme for Providing High Availability", ACM SIGMOD, 1992, pp. 236-245.

Pu, Calton, et al., "Replica Control in Distributed Systems: An Asynchronous Approach", ACM, 1991, pp. 377-386.

Mellor-Crummey, John, et al., "Synchronization Without Contention", ACM, 1991, pp. 269-278.

Goldring, Rob, "Things every update replication customer should know", ACM, 1995, pp. 439-440.

Polyzois, Christos A., et al., "Evaluation of Remote Backup Algorithms for Transaction-Processing Systems", ACM Transactions on Database Systems, vol. 19, No. 3, Sep. 1994, pp. 423-449.

Ivinskis, Kestutis, "High Availability of Commercial Applications", ACM, 1995, pp. 433-434.

King, Richard, P., et al., "Management of a Remote Backup Copy for Disaster Recovery", ACM Transactions on Database Systems, vol. 16, No. 2, Jun. 1991, pp. 338-368.

Kumar, Akhil, et al., "Cost and availability tradeoffs in replicated data concurrency control", ACM Transactions on Database Systems (TODS), vol. 18, Issue 1, Mar. 1993, (5 pages).

Bhide, Anupam et al., "An efficient scheme for providing high availability", The Guide to Computing Literature, 1992, (4 pages).

Polyzois, Christos et al., "Evaluation of Remote Backup Algorithms for Transaction Processing Systems", ACM SIGMOD, 1992, pp. 246-255.

Jensen, David W., et al., "File Archive Activity in a Supercomputing Environment", ACM, 1993, pp. 387-396.

Olken, Frank, "HOPT: A Myopic Version of the STOCHOPT Automatic File Migration Policy", ACM, 1983, pp. 39-43.

Weinstein, Matthew J., et al., "Transactions and Synchronization in a Distributed Operating System", ACM, 1985, pp. 115-126.

Awerbuch, Baruch et al., "Competitive Distributed File Allocation", ACM STOC, May 1993, pp. 164-173.

Sandhu, Harjinder S., et al., "Cluster-Based File Replication in Large-Scale Distributed Systems", Performance Evaluation Review, vol. 20, No. 1, Jun. 1992, pp. 91-102.

Andrews, Gregory R., "Paradigms for Process Interaction in Distributed Programs", ACM Computing Surveys, vol. 23, No. 1, Mar. 1991, pp. 82-90.

Alsberg, Peter A. et al., "A Principle for Resilient Sharing of Distributed Resources", 1976, pp. 562-570.

Wiebe, Douglas, "A Distributed Repository for Immutable Persistent Objects", ACM, Sep. 1986, pp. 453-465.

Gray, Jim, "Why Do Computers Stop and What Can Be Done About It?", Technical Report 85.7, Jun. 1985, pp. 1-35.

A.A. El Haddi et al., "Using Distributed File Replication for Business Continuance and Content Distribution," www.constantdata.com, Feb. 2003, 6 pgs.

International Search Report and Written Opinion for PCT/US2004/036474 mailed Sep. 12, 2005 (14 pages).

Quest Software, "NetBase for MPE" Reference Guide, Software Version—9.9, Guide Version—9.9, 2005.

Quest Software, "SharePlex for Oracle" Administrator's Guide, Version 7.6 (document revision 3), Mar. 22, 2012.

Quest Software, Inc., SharePlex for Oracle, Release Notes and Upgrade Instructions Version 4.5, Mar. 31, 2003, pp. 39.

Quest Software, Inc., SharePlex for Oracle, Release Notes and Upgrade Instructions Version 4.5.11, May 10, 2004, pp. 39.

Quest Software, Inc., SharePlex for Oracle, Release Notes and Upgrade Instructions Version 4.5.6, Nov. 6, 2003, pp. 40.

Quest Software, Inc., SharePlex for Oracle, Release Notes and Upgrade Instructions Version 4.0, Mar. 25, 2002, pp. 26.

Quest Software, Inc., SharePlex for Oracle, Release Notes and Upgrade Instructions Version 4.0, Jul. 9, 2003, pp. 33.

Quest Software, Inc., SharePlex for Oracle, Release Notes and Upgrade Instructions Version 3.2, Aug. 3, 2001, pp. 25.

Quest Software, Inc., SharePlex for Oracle, Reference Manual Version 4.5, Mar. 28, 2003, pp. 388.

Quest Software, Inc., SharePlex for Oracle, Reference Guide, Installation and Demonstration Guide Version 4.5, Mar. 28, 2003, pp. 388.

Quest Software, Inc., SharePlex for Oracle, Reference Guide Version 4.5, Mar. 28, 2003, pp. 388.

Quest Software, Inc., SharePlex for Oracle, Reference Guide Version 4.0, Mar. 25, 2002, pp. 378.

Quest Software, Inc., SharePlex for Oracle Version 4.0, Reference Guide, Mar. 25, 2002, pp. 378.
Quest Software, Inc., SharePlex for RAC/OPS, Installation and Demonstration Guide Version 4.5, Mar. 28, 2003, pp. 168.
Quest Software, Inc., SharePlex for Oracle, Installation and Demo Guide Version 3.2, Aug. 6, 2001, pp. 191.
Quest Software, Inc., SharePlex for Oracle, Installation and Demonstration Guide Version 4.5, Mar. 28, 2003, pp. 202.
Quest Software, Inc., SharePlex for Oracle Version 3.0, Installation and Demo Guide, Jan. 2001, pp. 145.
Quest Software, Inc. SharePlex for Oracle, Installation and Demonstration Guide Version 4.0, Mar. 25, 2002, pp. 176.
Quest Software, Inc. SharePlex for Oracle, Implementation Guide Version 3.0, Jan. 2001, pp. 517.
Quest Software, Inc. SharePlex for Oracle, Implementation Guide Version 3.2, Aug. 6, 2001, pp. 672.

Quest Software, Inc. SharePlex for Oracle, Administrator's Guide Version 4.5, Apr. 17, 2003, pp. 528.
Quest Software, Inc. SharePlex for Oracle, Administrator's Guide Instructions Version 4.5, Apr. 17, 2003, pp. 528.
Quest Software, Inc. SharePlex for Oracle, Administrator's Guide Instructions Version 4.5, Mar. 28, 2003, pp. 528.
Quest Software, Inc. SharePlex for Oracle, Administrator's Guide Version 4.0, Mar. 25, 2002, pp. 472.
Quest Software, Inc. SharePlex for RAC/OPS Version 4.5, Release Notes, Oct. 2, 2003, pp. 24.
Quest Software, Inc.,SharePlex for Oracle, Aug. 2001, 26 pages.
Quest Software, Inc., SharePlex Weekly Conference Call Script, SharePlex10.ppt, Nov. 3, 2002, 33 pages.

\* cited by examiner

DATA REPLICATION FROM ONE-TO-ONE OR ONE-TO-MANY HETEROGENEOUS DEVICES

CROSS-REFERENCE TO RELATED APPLICATION(S)

This application is a continuation of U.S. patent application Ser. No. 11/419,958, filed May 23, 2006 now U.S. Pat. No. 7,870,354. U.S. patent application Ser. No. 11/419,958 is a continuation-in-part of U.S. patent application Ser. No. 10/980,875, filed Nov. 3, 2004 now U.S. Pat. No. 7,836,014, and claims priority from U.S. Provisional Application No. 60/683,765, filed May 24, 2005. U.S. patent application Ser. No. 10/980,875 claims priority from U.S. Provisional Application No. 60/517,253, filed Nov. 4, 2003. U.S. provisional patent application Ser. No. 60/683,765 is incorporated by reference herein. U.S. patent application Ser. No. 11/419,958 is incorporated herein by reference.

TECHNICAL FIELD

Embodiments of the present invention relate generally to data replication for devices such as computers, storage devices, communication devices, sensor devices, and observation and measurement devices that are capable of sending and receiving data to and from other similar or dissimilar devices. Embodiments of the invention are particularly concerned with a hardware and operating system independent software method that replicates data as the data changes or passes through a device.

BACKGROUND

Many devices are used to collect, alter, store, or transmit data. These devices are capable of interconnecting with other devices via heterogeneous networks. Examples of these types of networks include satellite, wireless, packet radio, leased lines, Ethernet, ATM, DSL, Broadband, and the like.

Methods of data synchronizing various devices varies from device to device, and such methods are not unified. Computers have their own methods of data synchronization that are used for remote backups and content distribution. Various replication methods are used to replicate data from one source computer to another destination computer. The methods in use today suffer from several deficiencies. For example, after a failure of the source computer it is often a requirement that both the source and destination computers are required to be taken out of service while both the source and destination are resynchronized.

Existing methods do not extend to other intelligent devices such as embedded storage devices, flash memories, cell phones, cameras, medical imaging apparatuses, etc. Most existing replication techniques are concerned with computers or computer devices. Another drawback is the strict requirement that the source and destination devices be of the same type and architecture or at least have the same configuration. No existing technique combines replication of changed and pass-through data.

BRIEF SUMMARY

Example embodiments described herein relate to a software method that enables data synchronization and/or distribution of data content between one or many similar or dissimilar devices, or within the same device. Such data synchronization and distribution may occur in real time or near real time.

Devices such as computers, network storage appliances, storage virtualization devices, network routers, cellular telephones, point-of-sale devices, and security cameras are capable of capturing data, altering data, or passing data. These devices are capable of transmitting data via various networks such as the ones described in the background section.

At times it is desirable to track the data that is changing within a device or that is simply passing through the device and apply the same data changes to one or more other devices in a given configuration. For example, a user may want to keep many computers synchronized in such a way that at the end of each given time period, the content of the computers is the same. The user may use the techniques described herein to synchronize storage between many remote devices.

Another example is an intelligent storage device within a computer. The device can integrate its own operating system with the synchronization process described herein or rely on the operating system and the synchronization process running on the host computer. This device synchronizes itself with other intelligent devices by distributing entire data objects or partial data objects among each other.

A storage device that provisions storage from a storage area network (SAN) to network-based servers can be replicated over a network to one or more remote storage devices with the use of the techniques described herein. As data storage, provisioned by the storage device, is modified by network-based computers that access and change storage thru the storage device, the process that runs on the storage device will replicate some or all of the changing data storage to one or more remote storage devices over a computer network.

Another example is a camera or sensor attached to a communication device. As the camera or sensor device captures the data, or the data passes through the device, some or all of the data is copied to one or many remote devices. Configuration filters are used to decide what data to distribute.

One or many distributed heterogeneous production servers residing on a computer network may use the process described herein to replicate data to one or more remote storage backup appliances. As the data on the distributed heterogeneous production servers is modified, the servers will rely on the process to replicate some or all of the changing data to one or more remote storage backups appliances or remote servers to create an online mirror of data for disaster recovery or other high availability purposes. The data on the storage backup appliances or remote servers can then be archived to other permanent or temporary storage without impacting the data on the production servers. The process running on the remote production servers can be temporarily paused to produce a point-in-time snapshot copy of the data on the storage backup appliance.

In one embodiment, the process is implemented as a software method containing instructions. The instructions cause a programmable processor to keep track of changes that occur to data and record data about the changes on a device with permanent or volatile storage.

In another embodiment, the process is implemented as a method in which the content that is altered on a device is replicated to one or more devices.

In another embodiment, the process is implemented as a method in which the content that passes through one device is replicated to one or more devices.

In another embodiment, the technique is realized as a method in which the content of one source device is replicated for synchronization purposes to one or more devices after a failure or after deployment or installation of the device without interrupting the usage of the device source.

In another embodiment, the technique is realized as a method in which the content of similar and dissimilar devices is synchronized in real-time, near-real time or as needed.

In another embodiment, the procedure is realized as a method in which the configuration of the replication can be refreshed without shutting down the device and without interrupting replication.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in the figures depict one example arrangements of elements, additional intervening elements, devices, features, or components may be present in an embodiment of the invention (assuming that the functionality of the system is not adversely affected).

A system as described herein relates to data replication for devices such as computers, storage devices, communication devices, sensor devices, observation and measurement devices that are capable of sending and receiving data to and from other similar or dissimilar devices. One example embodiment is a hardware and operating system independent software method that replicates data as the data changes or passes through the device using the techniques described herein as opposed to on a periodic basis. The process may be resident on a host device, or it may be embedded in hardware such as EEPROM, gate arrays, processing logic, or memory elements.

Briefly, FIGS. 1-4 illustrate some use cases and configurations of example system embodiments, while FIGS. 5-12 illustrate the functional specification, the data flow diagrams, and the architecture of such system embodiments.

Figure 1:
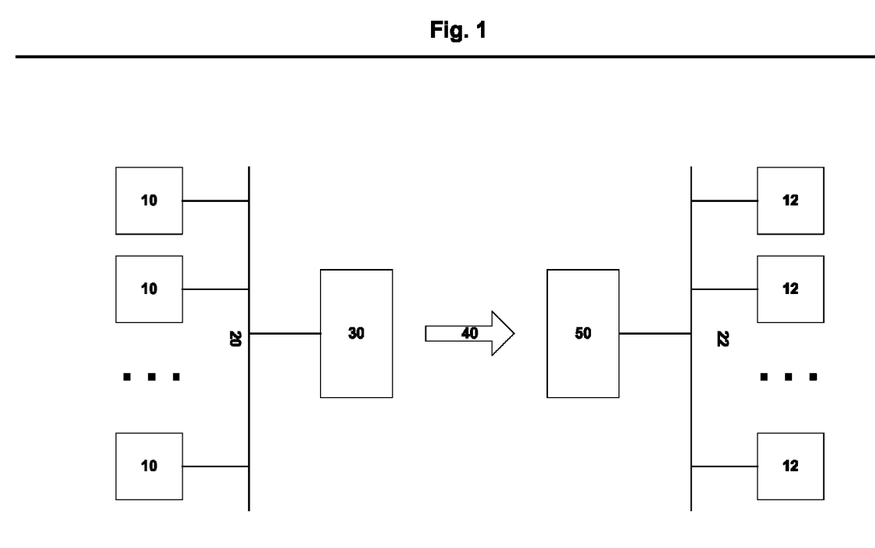
FIG. 1 is a block diagram showing an example deployment with a single source device and a single destination device.

FIG. 1 illustrates a generic environment in which the basic system configuration is implemented. In FIG. 1, a source device 30 is coupled to client devices 10 via a network 20. Source device 30 replicates data 40 modified, created by, or passing through the source device 30 to a destination device 50, which is optionally coupled to a set of client devices 12 via a network 22. The source device 30 and the destination device 50 are not necessarily of the same type or architecture. A typical operation is that a client device 10 alters or creates the content on the source device 30, or sends the data to another client by passing the data through the source device 30. The data modifications that occur on the source device 30, or pass through the source device 30, are replicated to the destination device 50. In practice, the processes described herein may be implemented in computer-executable instructions that are processed by the source device 30 and/or the destination device 50.

Those skilled in the art of software development, electrical engineering, data networking, control and physical sciences, or dynamical systems will realize that any computer, intelligent data storage device, intelligent control device, communication device or sensor or measurement device, data recording device and any type of network connectivity may be used in many combinations in the various environments described herein.

Figure 2:
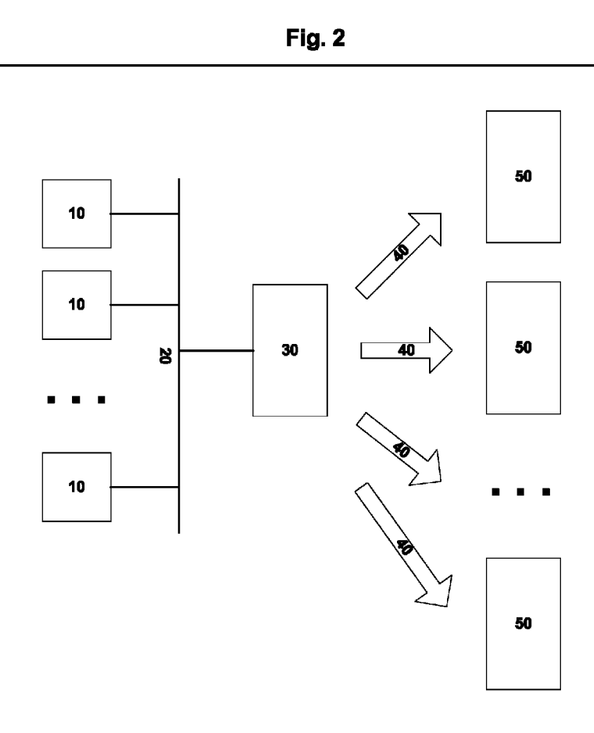
FIG. 2 is a block diagram showing an example deployment with a single source and multiple destinations.
Figure 3:
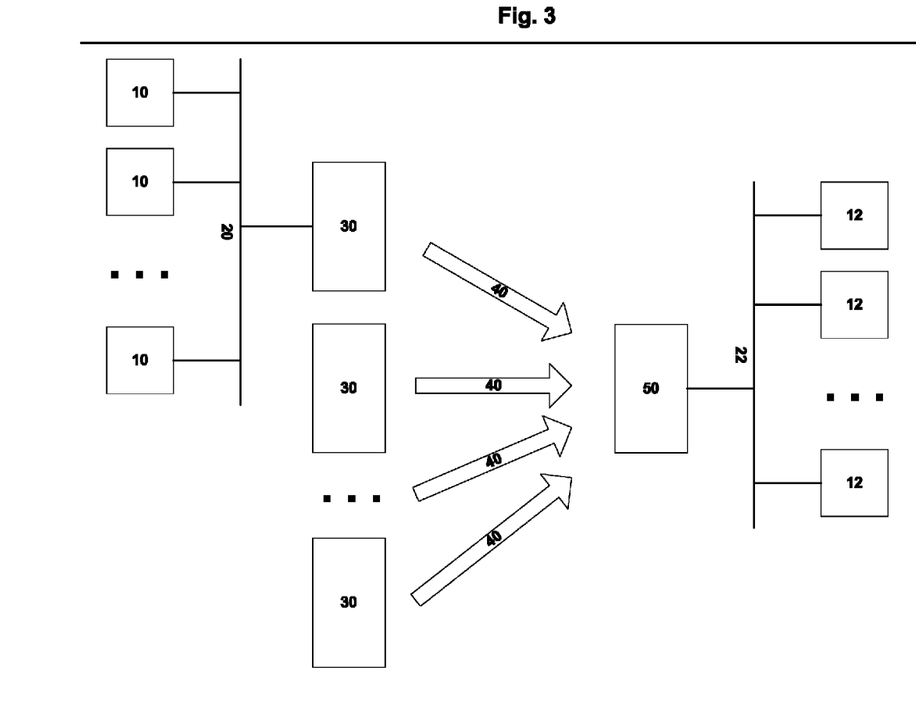
FIG. 3 is a block diagram showing an example deployment with multiple sources and a single destination.
Figure 4:
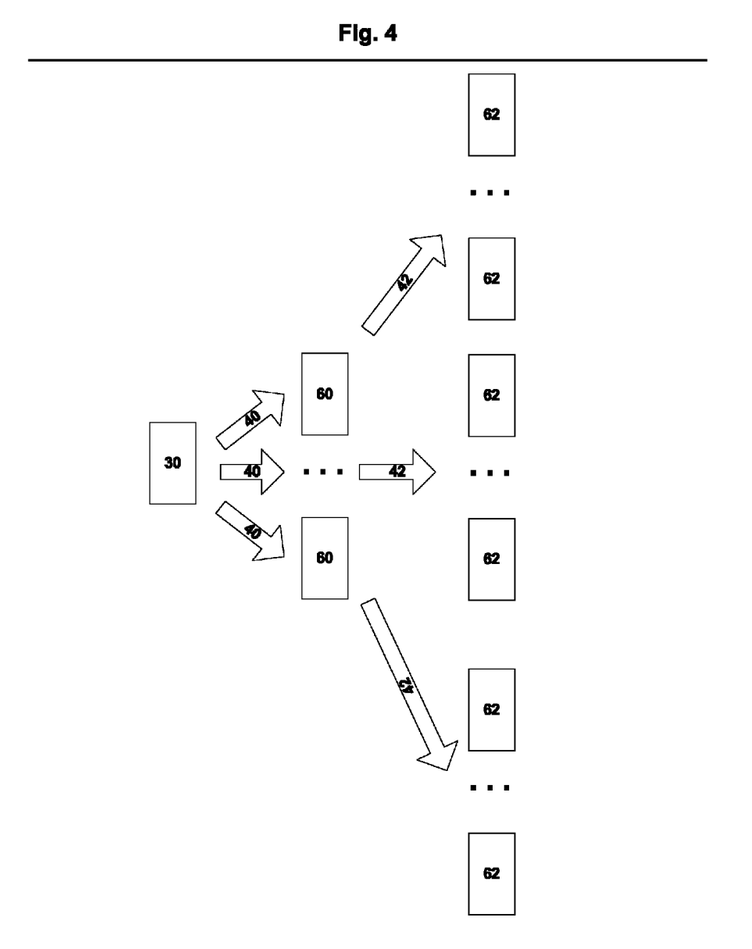
FIG. 4 is a block diagram showing an example deployment with a cascaded or fan-out single source and multiple destinations.

FIGS. 2-4 illustrate how this basic configuration of FIG. 1 may be extended and used in a variety of topologies and configurations. In FIG. 2, a source device 30 replicates data 40 modified, created, or passed through the source device 30 to multiple destination devices 50. In FIG. 3, multiple source devices 30 replicate data 40 to a single destination device 50. In FIG. 4, a source device 30 replicates data 40 that is modified on it or passed through it to several destination devices, which also act as source devices 60 in this example. Each device which functions as both a source and destination device 60 in turn replicates data 42 to another set of devices 62.

An embodiment of the invention may be configured to run as an application on the host device, or configured to be embedded in a logic or memory device such as EEPROM or gate arrays. Those skilled in the art of software development, electrical engineering, data networking, control and physical sciences, or dynamical systems will realize that the environments illustrated in FIGS. 1-4 only represent example configurations, and that alternative configurations may be used without departing from the scope of the present invention. The following sections illustrate the architecture and the design of example system embodiments.

Figure 5:
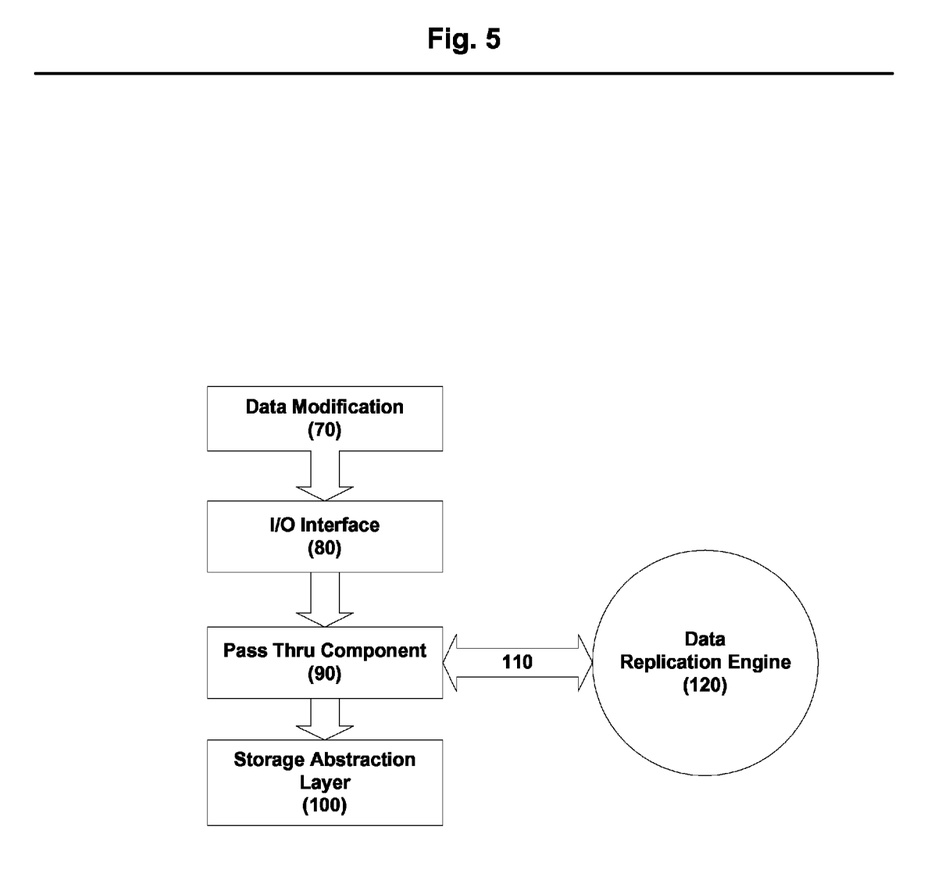
FIG. 5 is a block diagram of software components that may be utilized in an example system embodiment.

FIG. 5 is a functional diagram of one example replication system. It shows the interface between the replication processes and the components of the host device or the device in which the replication processes are embedded. FIG. 5 shows three components: pass through component 90; one or more modification queues 110; and data replication engine 120. In practice, these three components may be split into sub-components or combined into a single component.

The pass through component 90 is inserted between the device's own software presentation or I/O interface 80 to other client devices, and the physical transmission or storage layers 100 of the source device. As data modification requests pass through the pass through component 90, the data attributes are saved in the modification queue 110, for later retrieval by the data replication engine 120.

Figure 6:
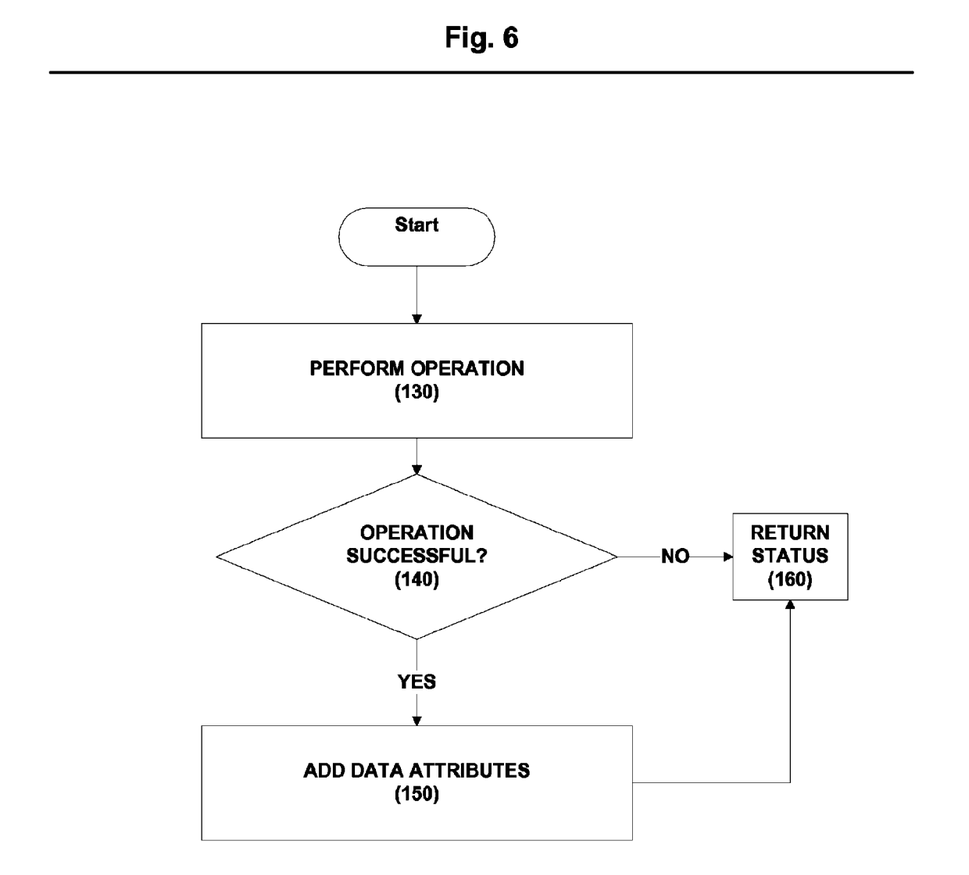
FIG. 6 is a flow chart of an example process whereby a pass-through component captures attributes representing data changes in real time.

FIG. 6 illustrates the order of operations performed by the pass through component 90. The various tasks performed in connection with this process (and other methods and processes described herein) may be performed by software, hardware, firmware, or any combination thereof. It should be appreciated that a described process may include any number of additional or alternative tasks, the tasks shown in a particular flow chart need not be performed in the illustrated order, and a described process may be incorporated into a more comprehensive procedure or process having additional functionality not described in detail herein.

Referring again to FIG. 6, the requested operation is performed (task 130), and, if the operation is successful (query task 140), the attributes describing the data modification are added (task 150) to the modification queue 110. Following task 150, or if the operation is not successful, then an appropriate status is returned (task 160).

Figure 7:
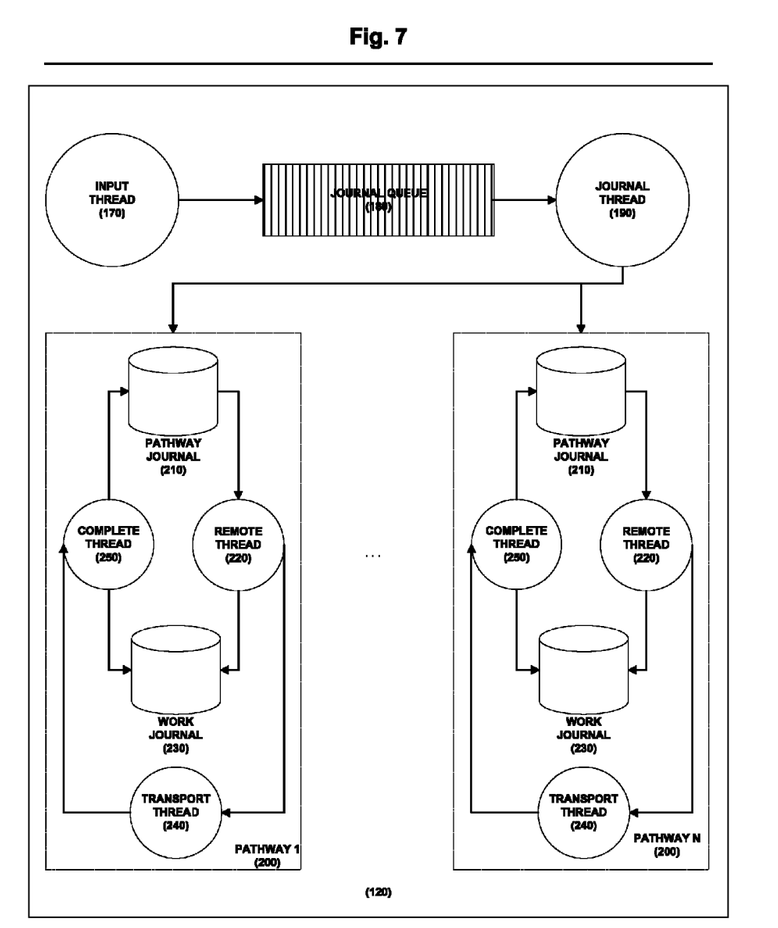
FIG. 7 is a flow chart of an example process whereby a data replication engine component processes attributes representing data changes using several concurrent threads.

FIG. 7 illustrates the functionality of the data replication engine 120. The data replication engine 120 has one or more configuration files (not shown). The configuration files include such information as what devices will receive which data, what data to replicate, when to suspend replication, when to resume it, etc. The data replication engine 120 has several threads that execute concurrently (170, 190, 250, 220, 240). The data replication engine 120 has one or many replication pathways 200. These replication pathways 200 are referred to simply as pathways. Each pathway 200 has a pathway journal 210. The input thread 170 retrieves modification attributes from the modification queue 110 of the pass through component 90, and stores them on the journal queue 180. Concurrently, the journal thread 190 retrieves attributes from the journal queue 180, and inserts each item into the pathway journal 210 of each pathway 200, according to configuration data (not shown), or increments the reference count of the item if it is already present in the journal. Concurrently, within each pathway 200, a remote thread 220 retrieves items from the pathway journal 210. If a given item is not already present in the work journal 230, the item is stored there and passed to the transport thread 240. Each pathway may have one or more transport threads 240. If the item is already present in the work journal 230, a reference count for that item is incremented. When the transport thread 240 has completed replicating the data represented by the attribute item, it passes the item to the complete thread 250. The item is deleted from the work journal 230 by the complete thread 250, and if the reference count in the pathway journal 210 is zero, the item is removed from the pathway journal 210 as well.

Those skilled in the art of software design will realize that using another number of threads, concurrent, serial or parallel components may be used without departing from the scope of the invention.

Figure 8:
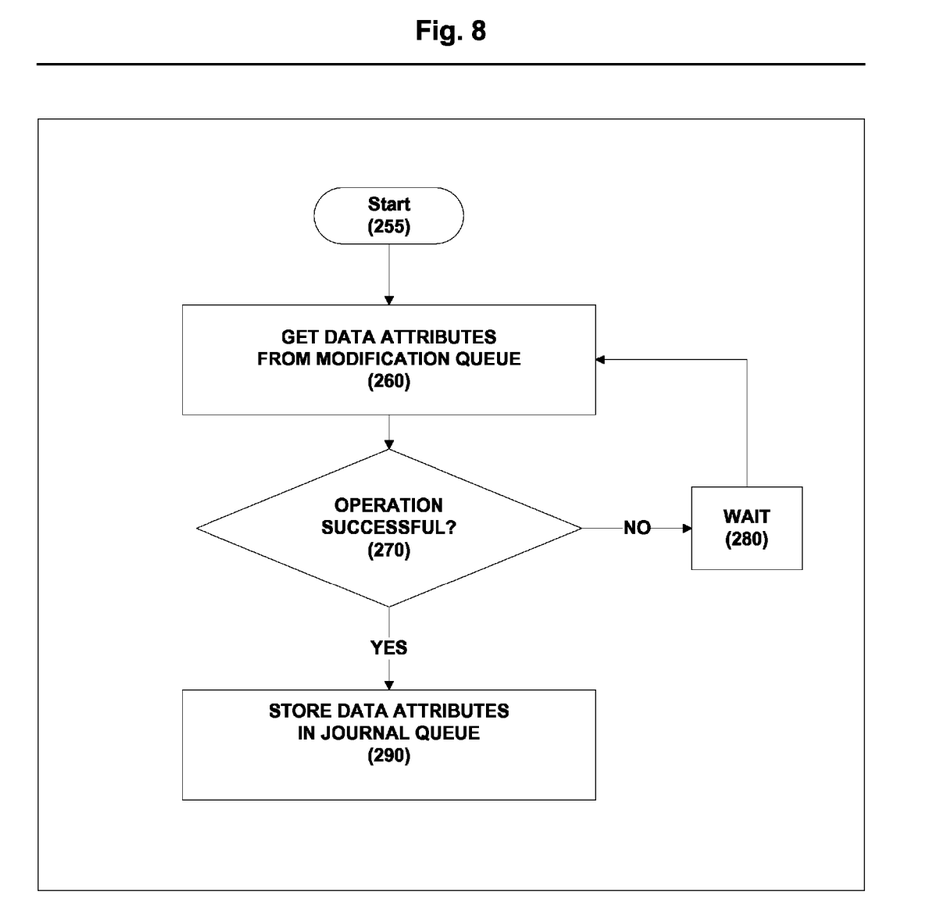
FIG. 8 is a flow chart of an example process followed by an input thread component of a data replication engine.

FIG. 8 is a flow chart that further illustrates the steps performed by the input thread 170. First, data attributes are retrieved (task 260) from the modification queue 110 used by the pass through component 90. If an item was successfully retrieved (query task 270), the item is added to the journal queue (task 290). If the item was not successfully retrieved, the input thread will wait (task 280) for more items to be available and retry to get another item (task 260).

Figure 9:
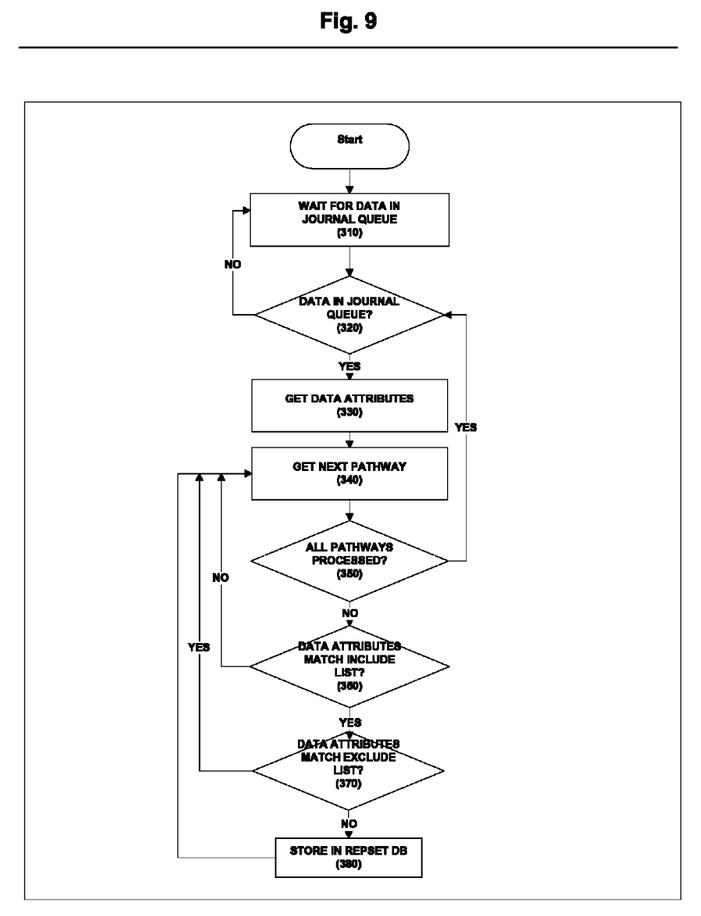
FIG. 9 is a flow chart of an example process followed by a journal thread component of a data replication engine.

FIG. 9 is a flow chart that further illustrates the steps performed by the journal thread 190. Once initialized, the journal thread waits for data to be placed into the journal queue by an input thread (not shown). A trigger (task 320) in the journal queue is initiated which indicates the presence of data in the queue. For each item (task 330) in the queue, the next pathway is retrieved (task 340), until all pathways have been retrieved for that journal queue item. Each journal item is compared against the include list (task 350) for the retrieved pathway. If the item does not match, the next pathway (task 340) is retrieved. If the item does match, it is compared against the include list (task 360) for the retrieved pathway. If the item matches the include list, the next pathway (task 340) is retrieved. If the item matches the include list, and does not match the exclude list (task 370), it is stored in the journal for the repset (task 380) represented by the current pathway. Thus, if data is present in the journal queue, the first item is retrieved, and for each configured pathway, the retrieved data item is compared against configuration data for that pathway. If the configuration for a pathway indicates that the item is applicable to that pathway, the item is stored in the pathway DB.

Figure 10:
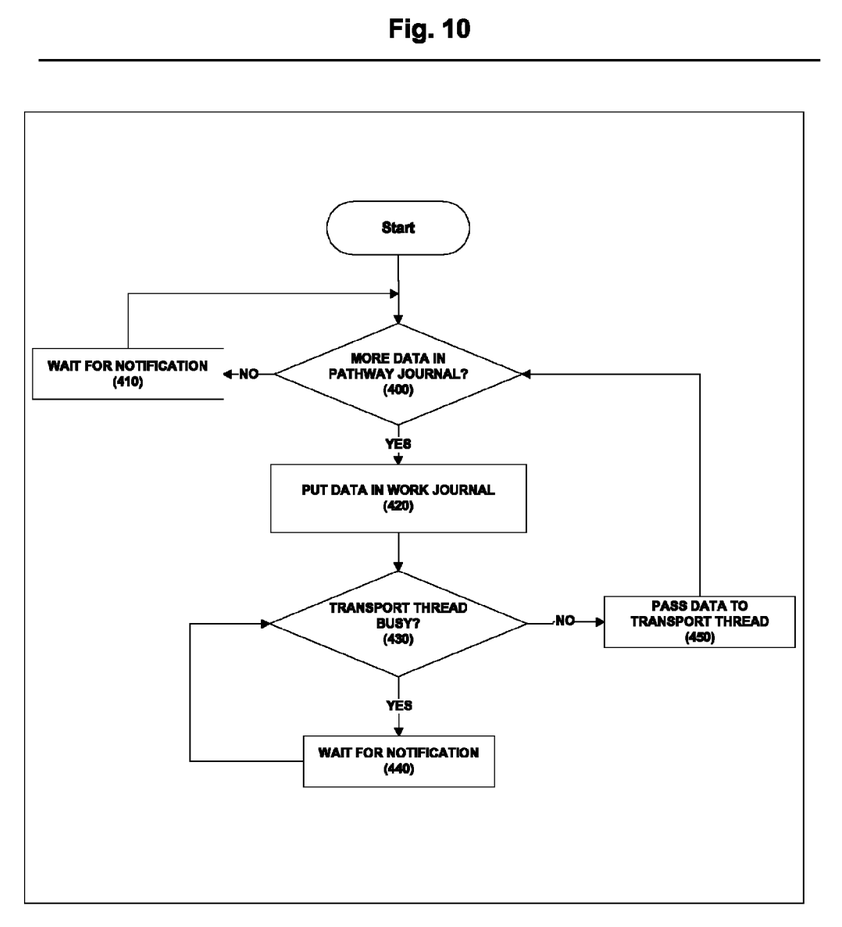
FIG. 10 is a flow chart of an example process followed by a remote thread component of a data replication engine.

FIG. 10 is a flow chart that further illustrates the steps performed by the remote thread 220 within each pathway. If replication is not suspended and if data is present in the pathway journal (query task 400), that data is retrieved and put in the work journal (task 420). If the transport thread is not busy (query task 430), then the data is sent to the transport thread (task 450). If the transport thread is busy (query task 430), it waits for notification (task 440) from the transport thread 240 that it will accept further input.

Figure 11:
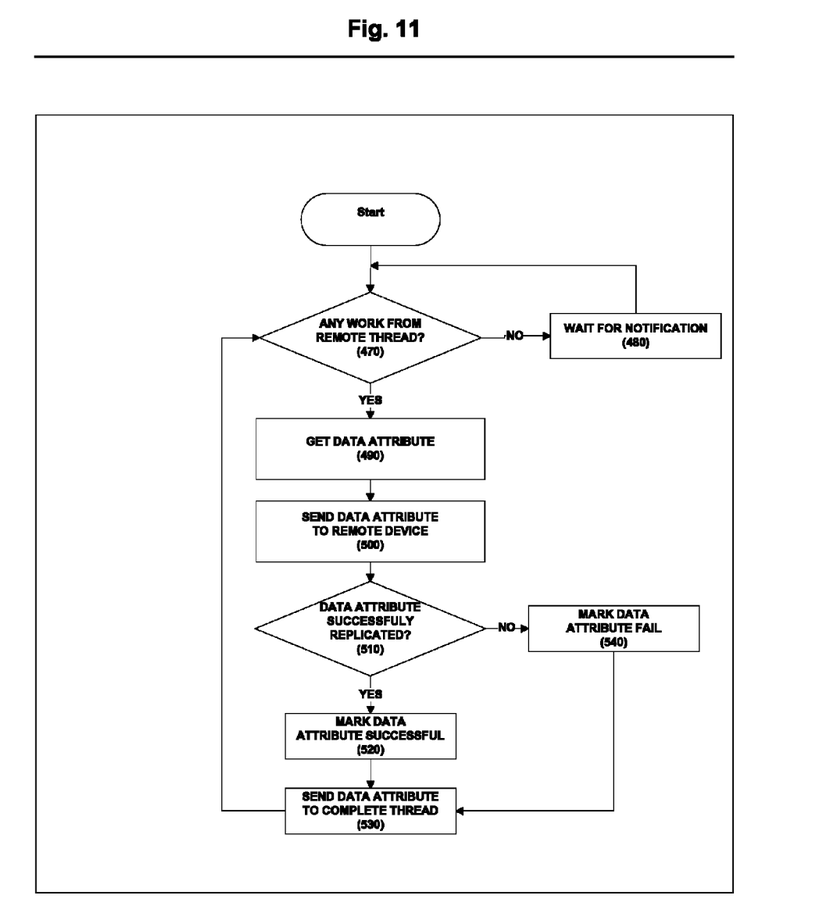
FIG. 11 is a flow chart of an example process followed by a transport thread component of a data replication engine.

FIG. 11 is a flow chart that further illustrates the steps performed by the transport thread 240. If data is not available from the remote thread (query task 470), then the transport thread waits for notification that data is available (task 480). When data is available, that data is retrieved and sent to the remote device (task 500). If the replication of data was successful (query task 510), the data item is marked as successful (task 520), and if not, it is marked as failed (task 540). After a data attribute is marked (task 520 or task 540), it is sent to the complete thread (task 530) and the thread checks if more work is available (query task 470). The transport thread 240 negotiates with the remote transport thread (not shown) over what compression methods and levels to use. The transport thread 240 monitors the transfer rates and changes the compression methods and level to obtain optimal transfer rates or reduce rates according the policy in the configuration (not shown).

Figure 12:
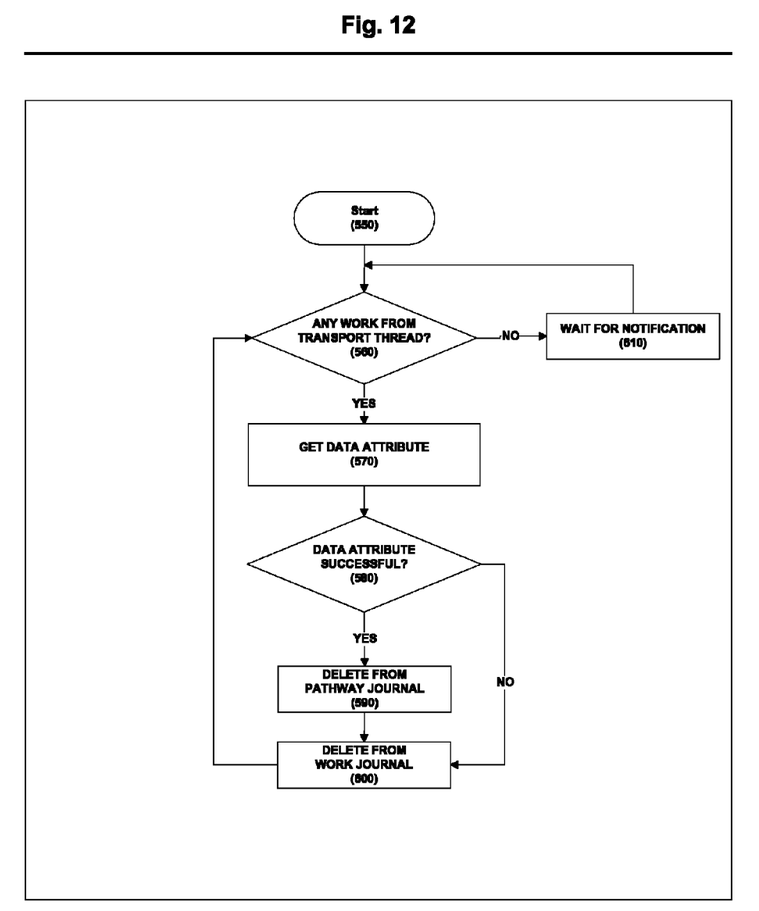
FIG. 12 is a flow chart of an example process followed by a complete thread component of a data replication engine.

FIG. 12 is a flow chart that further illustrates the steps performed by the complete thread 250. If data is not available from the transport thread (query task 560), then the complete thread waits for notification that data is available (task 610). When data is available, that data is retrieved. If the transport thread marked the data as successful (query task 580), the item is deleted from the pathway journal (task 590). The data item is then deleted from the work journal (task 600).

In summary, systems, devices, and methods configured in accordance with example embodiments of the invention relate to:

A method and apparatus for real time content distribution and replication, where each source and destination device has either volatile or non-volatile storage (or a combination of both volatile and non-volatile storage), that comprises one or more of the following: (a) one or more devices that alter generate or forward data on or to other devices; (b) one or more source devices with ability to modify content, generate content, or accept content from one or more devices and to send content to one or more local or remote destination devices; (c) one or more destination devices with ability to modify content, generate content, or accept content from one or more devices; (d) one or more direct or indirect communications means to interconnect source and destination devices.

A method for hybrid real time replication and content distribution that comprises: (a) accepting a request from a client device to change data; (b) adding data attributes of changed data to a message queue; (c) saving data attributes of changes on a storage device; (d) performing changes and saving the status of the data alteration operation; and (e) communicating the status of the operation to the device that requested the change if it has requested that the status be communicated back to it. The hybrid method may combine elements of synchronous and asynchronous operations.

Concurrently with the method described in the immediately preceding paragraph, a method of journaling data and content alterations comprising: (a) fetching the modified or new content attributes (data attributes) from the device journal of the device that performed the data alteration; (b) adding the fetched change data attributes to a journal message queue; (c) removing each message from the journal message queue; (d) saving the message data attributes if the attributes match the specified patterns for one destination device, where the attributes are saved on available non-volatile or volatile storage within or outside the device that performed the data alteration; (e) repeating step (d) for each destination device; and (f) starting the process again from step (a).

Concurrently with the method described in the immediately preceding paragraph, a method of replicating journaled data attributes using the following steps for each destination device: (a) get one or more data attributes from the storage for a given destination device if replication to the destination device is not suspended; and (b) send the content described by the data attributes to the destination device if replication to the destination device if not suspended.

A method for hybrid real time replication and content distribution that comprises: (a) accepting a request to forward data from a client device to another device; (b) adding data attributes of forwarded data to a message queue; (c) saving data attributes of forwarded data on a storage device; (d) performing changes and saving the status of the data alteration operation; and (e) communicating the status of the operation to the device that requested the change if it has requested that the status be communicated back to it.

A method of capturing data or content alterations synchronously and replicating them to one or more destination devices asynchronously wherein the configuration can change without stopping the operation of the source device or stopping access to the device.

A method of replicating a shared data set bi-directionally between two similar or dissimilar devices.

A method of adaptive compression used during the transmission of replicated data from one source device to one or more destination devices.

A method of using adaptive compression during transmission of replicated data from one source device to one or more destination devices.

A method of using encryption during transmission of replicated data from one source device to one or more destination devices.

A method of using temporal locality of changes allowing parallel replication streams between source and destination devices to propagate more than one change at a time, while still ensuring data ordering and integrity.

A method of temporarily suspending data replication to one or more devices using a trigger variable in non-volatile storage. The trigger indicates that data replication to a given device does not proceed until the replication is resumed by an external agent. The method may resume replication by removing the trigger that paused replication.

A method of allowing the data on the source device to be readable, writable, or modifiable immediately after data replication is started whereby not requiring the source device to be quiesced and synchronized with one or more destination devices.

A method of concurrently replicating new data changes between the source device and one or more destination devices while the data that existed prior to starting data replication on the source devices is synchronized to one or more remote devices.

A method of consolidating changes and updates while preserving the order of data write and change operations.

A method of initializing replication to perform the initial synchronization of the content of the source and destination devices and to allow recovery from intermittent failures. The method comprises: (a) read the list of all data attributes on the source device; (b) if the attributes match the patterns of data attributes that must be replicated, add the list of the attributes to a journal message queue as described above.

A method of replication implemented as software independent of the operating systems and other applications.

A method of replication independent of hardware.

A method of embedding the invention in hardware, gate arrays, EEPROM, logic or memory devices.

The methods illustrated by FIGS. 5-12.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method for data replication and content distribution, the method comprising:
   accepting a request from a client device to forward data to a second device using a data forwarding operation, the data including data attributes and content;
   adding the data attributes of the data to a message queue;
   saving the data attributes of the data on a storage device;
   determining, based at least in part on the data attributes, what content of the data to forward to the second device;
   processing the data attributes concurrently;
   forwarding the determined content of the data to the second device, the forwarding including replicating the determined content of the data to the second device using a plurality of parallel replication streams between the client device and the second device to propagate more than one change at a time between the client device and the second device; and
   saving a status of the data forwarding operation.

2. The method of claim 1 further comprising communicating the status of the data forwarding operation to the client device that requested the data forwarding operation.

3. The method of claim 1 further comprising performing adaptive compression during the forwarding of the determined content of the data to the second device.

4. The method of claim 1 wherein determining, based at least in part on the data attributes, what content of the data to forward to the second device includes matching the data attributes to patterns.

5. The method of claim 4 wherein the patterns are pre-specified in a configuration.

6. The method of claim 5 wherein the data attributes that match the patterns are used to determine what content of the data to replicate to the second device.

7. The method of claim 1 wherein the client device and the second device are of dissimilar type and architecture.

8. The method of claim 1 wherein replicating the requested data to the second device occurs in real-time.

9. The method of claim 1 wherein replicating the requested data to the second device occurs in near-real-time.

10. The methods of claim 1 further comprising forwarding the requested data to an additional second device.

* * * * *